Dec. 15, 1936.                    H. W. LEE                    2,064,550
                                   LENS
                           Filed Nov. 23, 1934
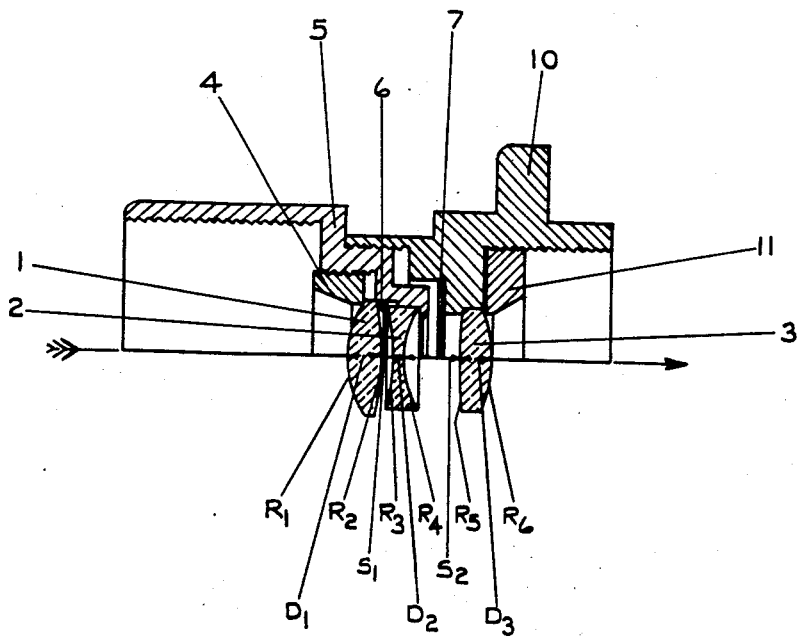
INVENTOR.

Patented Dec. 15, 1936

2,064,550

UNITED STATES PATENT OFFICE 2,064,550

LENS

Horace William Lee, Leicester, England, assignor to Kapella Limited, Leicester, England, a corporation of England Application November 23, 1934, Serial No. 754,434
In Great Britain December 22, 1933

7 Claims. (Cl. 88—57)

This invention relates to large aperture anastigmatically corrected lenses for photography, projection and the like, of the kind comprising a dispersive element placed between two collective elements; and its object is to provide an improved construction especially suitable for lenses of short focal length and large aperture.

Hitherto in lenses of the kind referred to, having an aperture greater than $f/4$, the dispersive element has been placed more or less equidistant from the collective elements. It is desirable, however, to use an unsymmetrical arrangement of the elements to facilitate the mounting of the lens elements, iris diaphragm and/or shutter in the lens tube. This advantageous result is due to the fact that if the dispersive element is placed considerably nearer one collective element than the other, the degree of spacing between the dispersive element and the furthest element becomes less important. Hence, if the dispersive element and the nearer collective element are mounted as one unit in which their relative positions can easily be fixed with sufficient accuracy, there is little difficulty in positioning the other collective member in the lens tube on the opposite side of the iris diaphragm and/or shutter mechanism to such unit.

This unsymmetrical arrangement of the elements above mentioned has been employed hitherto in certain lenses with apertures not exceeding $f/4.5$. It entails that the powers of the dispersive element and the front collective element should be increased relatively to the power of the system and/or of the rear collective element; and this, in turn, introduces zonal spherical aberration which has limited the aperture as aforesaid.

It is the principal object of the present invention to extend the aperture of such unsymmetrical lenses of the kind referred to by improvements which reduce this zonal spherical aberration to an amount admissible especially in short focus lenses, and, according to the invention, this is attained in lenses with apertures so large as $f/2.5$ by the following means which enable me to reduce the zonal spherical aberration:

(a) making the power of the front collective element less than two-and-a-half times and greater than one-and-a-half times, and the power of the dispersive element less than three times and greater than two-and-a-half times, the power of the system;

(b) making the radius of curvature of the first surface of the system and that of the fourth surface between seven-twentieths and one-half the focal length of the system.

Also according to the invention I may use the following means for maintaining corrections for coma, astigmatism and distortion, over an angular field of about thirty degrees:

(c) making the ratio of the radii of the third and fourth surfaces between 1.12 and 2.0, the shallower surface facing the front;

(d) making the ratio of the radii of the second and first surfaces between 2.5 and 5.0.

On the above bases anyone skilled in the art of lens computation can calculate a fully-corrected lens of the large aperture referred to.

Preferably, in order to reduce field curvature, the refractive index of one or both of the collective elements should amount to at least 1.57.

Preferably, the exposed front element is made of glass of refractive index less than 1.60, as such glass is less liable to atmospheric corrosion than is denser glass.

I now give data for the construction of a typical lens according to my invention, illustrated, with a suitable form of mount, in the accompanying drawing.

The lens comprises three elements 1, 2 and 3. The elements 1 and 2 are held between the parts 4 and 5 of the lens mount with a separating ring 6 therebetween. These elements 1 and 2 and parts 4, 5 and 6 constitute a unit separable from the rest of the lens system and mount therefor and capable of very accurate adjustment as regards the relative positions of its constituent parts.

The iris diaphragm is shown diagrammatically at 7.

The third element 3 of the lens system is mounted on the flange plate 10 by a screw ring 11.

The notation with respect to the lens system is that the successive radii of curvature, counting from the front, are called $R_1$, $R_2$, etc., the sign + denoting that the curve is convex toward the incident light, and — that it is concave toward the same. The axial thicknesses of the elements are denoted by $D_1$, $D_2$, etc., and the separations of the components by $S_1$, $S_2$, etc.

The material is defined in terms of the mean refractive index $nD$, as conventionally employed, followed by the type number in Messrs. Chance Brothers' optical glass catalogue of 1934. The Abbe V number is also given:—

*Example*

Equivalent focal length 1.0. Aperture f/2.5

| Radii | Thickness | Separation | $nD$ | V | No. |
|---|---|---|---|---|---|
| $R_1+0.4$ | $D_1 0.13$ |  | 1.5823 | 56.1 | 582561 |
| $R_2-1.176$ |  | $S_1 0.07$ |  |  |  |
| $R_3-0.516$ | $D_2 0.04$ |  | 1.6203 | 36.1 | 620361 |
| $R_4+0.370$ |  | $S_2 0.18$ |  |  |  |
| $R_5+2.04$ | $D_3 0.10$ |  | 1.6133 | 59.3 | 613593 |
| $R_6-0.49$ |  |  |  |  |  |

What is claimed is:

1. An anastigmatically corrected lens for photography, projection, and the like, comprising a dispersive element between two collective elements and placed so that its distance from the front collective element (that is, the element on the side of the longer conjugate for which the lens is corrected), is less than half its distance from the rear collective element, in which the power of said front collective element is less than two-and-a-half times and greater than one-and-a-half times, and the power of the dispersive element less than three times and greater than two-and-a-half times, the power of the system.

2. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the radius of curvature of the outer surface of the front collective element (that is, the first surface in the system) and that of the fourth surface (at the rear of the dispersive element) are each between seven-twentieths and one-half the focal length of the system.

3. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the ratio of the radii of the third and fourth surfaces lies between 1.12 and 2.0, the shallower surface facing the front.

4. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the radius of curvature of the outer surface of the front collective element (that is, the first surface in the system) and that of the fourth surface (at the rear of the dispersive element) are each between seven-twentieths and one-half the focal length of the system, and in which the ratio of the radii of the third and fourth surfaces lies between 1.12 and 2.0.

5. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the ratio of the radii of the second and first surfaces lies between 2.5 and 5.0.

6. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the radius of curvature of the outer surface of the front collective element (that is, the first surface in the system) and that of the fourth surface (at the rear of the dispersive element) are each between seven-twentieths and one-half the focal length of the system, and in which the ratio of the radii of the second and first surfaces lies between 2.5 and 5.0.

7. An anastigmatically corrected lens for photography, projection, and the like, comprising a dispersive element between two collective elements and placed so that its distance from the front collective element (that is, the element on the side of the longer conjugate for which the lens is corrected) is less than half its distance from the rear collective element, in which the power of said front collective element is less than two-and-a-half times and greater than one-and-a-half times, and the power of the dispersive element less than three times and greater than two-and-a-half times, the power of the system, and in which the radius of curvature of the outer surface of the front collective element (that is, the first surface in the system) and that of the fourth surface (at the rear of the dispersive element) are each between seven-twentieths and one-half the focal length of the system, and in which the ratio of the radii of the third and fourth surfaces lies between 1.12 and 2.0, and the ratio of the radii of the second and first surfaces lies between 2.5 and 5.0.

HORACE WILLIAM LEE.